(12) United States Patent
Shiraishi et al.

(10) Patent No.: US 8,371,030 B2
(45) Date of Patent: Feb. 12, 2013

(54) MAINTENANCE METHOD OF WIND TURBINE GENERATOR

(75) Inventors: Yasuaki Shiraishi, Tokyo (JP); Kunikazu Watanabe, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 25 days.

(21) Appl. No.: 12/956,335

(22) Filed: Nov. 30, 2010

(65) Prior Publication Data

US 2011/0138595 A1 Jun. 16, 2011

Related U.S. Application Data

(63) Continuation of application No. PCT/JP2010/064843, filed on Aug. 31, 2010.

(51) Int. Cl.
*B23P 6/00* (2006.01)
(52) U.S. Cl. .................. 29/889.1; 29/426.3; 212/175
(58) Field of Classification Search .............. 29/889.1, 29/889, 426.1, 426.3; 212/175, 176, 179, 212/270, 297
See application file for complete search history.

(56) References Cited

U.S. PATENT DOCUMENTS

| 4,311,434 | A * | 1/1982 | Abe | 416/142 |
|---|---|---|---|---|
| 6,278,198 | B1 * | 8/2001 | Willis et al. | 290/55 |
| 6,505,785 | B2 * | 1/2003 | Willis et al. | 290/55 |
| 7,895,744 | B2 | 3/2011 | Numajiri | |
| 2003/0183594 | A1 * | 10/2003 | Torres | 212/196 |
| 2007/0151194 | A1 * | 7/2007 | Livingston et al. | 52/651.05 |
| 2010/0101086 | A1 * | 4/2010 | Amram | 29/889.1 |
| 2010/0111665 | A1 * | 5/2010 | Daniels | 414/814 |
| 2010/0254813 | A1 * | 10/2010 | Dawson et al. | 416/146 R |

FOREIGN PATENT DOCUMENTS

| DE | 19647515 A1 | 5/1998 |
|---|---|---|
| DE | 10028513 A1 | 1/2002 |
| EP | 1101936 A2 | 5/2001 |
| EP | 1239150 A2 | 9/2002 |
| FR | 2903739 A1 | 1/2008 |
| JP | 1208575 A | 8/1989 |
| JP | 2002248560 A1 | 9/2002 |
| JP | 2004036407 A | 2/2004 |
| JP | 2006022675 A1 | 1/2006 |
| JP | 2006077456 A | 3/2006 |
| JP | 2006207502 A | 8/2006 |
| JP | 2009002175 A | 1/2009 |

OTHER PUBLICATIONS

Extended Search Report for EP 10779663 mailed Jun. 26, 2012.

* cited by examiner

*Primary Examiner* — David Bryant
*Assistant Examiner* — Ryan J Walters
(74) *Attorney, Agent, or Firm* — Kanesaka Berner & Partners, LLP

(57) ABSTRACT

A maintenance method is provided for a wind turbine generator including a tower and a nacelle. The maintenance method includes: attaching a pedestal to the tower; attaching a jack to the pedestal; and lifting the nacelle by using the jack to detach the nacelle from the tower, from a state where the nacelle is rotatably connected to the tower.

4 Claims, 20 Drawing Sheets

27: SELF-TAPPING-INSERT INSERTING TOOL

MAINTENANCE METHOD OF WIND TURBINE GENERATOR

CROSS-REFERENCE TO RELATED APPLICATION

This application is a continuation of International Application No. PCT/JP2010/064843, filed on Aug. 31, 2010.

BACKGROUND OF THE INVENTION

1. Field of the Invention

The present invention relates to a maintenance method of a wind turbine generator, and especially relates to a method for carrying out a maintenance work which involves detaching the nacelle from the tower.

2. Description of the Related Art

Some maintenance works of a wind turbine generator involves detaching the nacelle from the tower. Such maintenance works include replacement of the yaw rotation bearing or a bearing seal, adjustment of a shim attached to the tower-top flange, painting of the outer ring of the yaw rotation bearing, and repair of the lower part of the nacelle cover.

In a case where a maintenance work is carried out after detaching the nacelle from the tower, the nacelle is detached from the tower and is landed on the ground by using a large size crane, and then the intended maintenance work is carried out. However, in the procedure of such maintenance work, there are two problems. Firstly, in order to land the nacelle by using the large size crane, a lot of machinery and much manpower are required, and legal preparation (for example, a road-use permission and so on) is required. This means that the maintenance work requires great costs and a long period for the maintenance. Secondary, a large site is required to place the nacelle and the wind turbine rotor. The area of the site required for the maintenance may reach several dozen meters square. This restricts flexibility of the maintenance. If the maintenance which involves detaching of the nacelle from the tower can be carried out without using a large crane, a large merit would be obtained in reduction of the cost due to simplification of the maintenance and in improvement of the flexibility of the maintenance work.

As a related prior technique, Japanese Patent Application Publication No. 2006-22675A discloses a technique for constructing a tower of a wind turbine generator without using a large size crane. In the technique described in this publication, a mast is inserted into the tower and the nacelle is mounted on the tower and a pushing-up member capable of moving upward and downward relatively to the mast is additionally attached to the mast. In the construction of the tower, the mast is lifted up by applying a reaction force to an already constructed part of the tower via the pushing-up member, and subsequently the pushing-up member is lifted up. After that, the expansion part of the tower is constructed between the already-constructed part of the tower and the pushing-up member. The tower is completed in the same manner, by repeating: the lifting of the mast and the construction of the expansion part of the tower. After the completion of the tower, the mast is removed, and the nacelle is fixed to the tower.

In addition, Japanese Patent Application Publication No. 2002-248560A discloses a technique for replacing a rotation bearing after lifting up a heavy swivel. In this technique, the swivel is lifted up from a pedestal by a lifting jack provided on a placement table placed on a floor surface, and after that, the rotation bearing is replaced. After the replacement of the rotation bearing, the swivel is returned to the pedestal.

SUMMARY OF THE INVENTION

Therefore, an objective of the present invention is to provide a technique to make it possible to perform a maintenance work which involves detaching a nacelle from a tower without using a large size crane.

In one aspect of the present invention, a maintenance method of a wind turbine generator including a tower and a nacelle is provided with steps of: attaching a pedestal to the tower; a step for attaching a jack to the pedestal; and lifting the nacelle by using the jack to detach the nacelle from the tower, from a state where the nacelle is rotatably connected to the tower.

In one embodiment, the maintenance method of the wind turbine generator of this embodiment is applied to replacement of a yaw rotation bearing for rotatably connecting the nacelle to the tower. In this case, the yaw rotation bearing is replaced in a state where the nacelle is lifted by the jack and is detached from the tower.

More specifically, the step of replacing the yaw rotation bearing includes steps of: attaching a pulley to the nacelle; preparing a winch; lifting a container to the vicinity of the nacelle by using a wire connected to the winch and looped on the pulley; putting the yaw rotation bearing attached to the nacelle on the container; and landing the container on which the yaw rotation bearing is put on the ground by using the wire. In addition, in one embodiment, the step for replacing the yaw rotation bearing further includes steps of: lifting the container on which a new yaw rotation bearing is put to the vicinity of the nacelle by using the wire connected to the winch and looped on the pulley; and attaching the new yaw rotation bearing to the nacelle.

In one embodiment, a plurality of jacks may be prepared for lifting the nacelle. In this case, in order to reduce interference with the yaw rotation bearing and/or the container, it is preferable that at least one of the jacks is positioned outside the tower. In this case, the step of attaching the pedestal to the tower may include steps of: boring a manhole through the tower; and inserting the pedestal through the manhole from the inside of the tower to the outside.

In order to improve certainty of the supporting of the nacelle, it is preferable that the maintenance method of the wind turbine generator further includes a step of inserting a stopper between the nacelle and the tower after lifting the nacelle by using the jack to detach the nacelle from the tower.

In one embodiment, the step of attaching the pedestal to the tower includes steps of: forming an internal thread through a tower top flange provided at the upper end of the tower; and connecting the pedestal to the tower by screwing a bolt through the internal thread. In this case, it is preferable that the forming of the internal thread through the tower top flange is achieved by inserting a self-tapping insert into the tower top flange, wherein the self-tapping insert is approximately cylindrical and has threads on the inner and outer surfaces.

The present invention provides a technique for making it possible to perform a maintenance work which involves detaching the nacelle from the tower, without using the large size crane.

DESCRIPTION OF THE PREFERRED EMBODIMENTS

Figure 1:
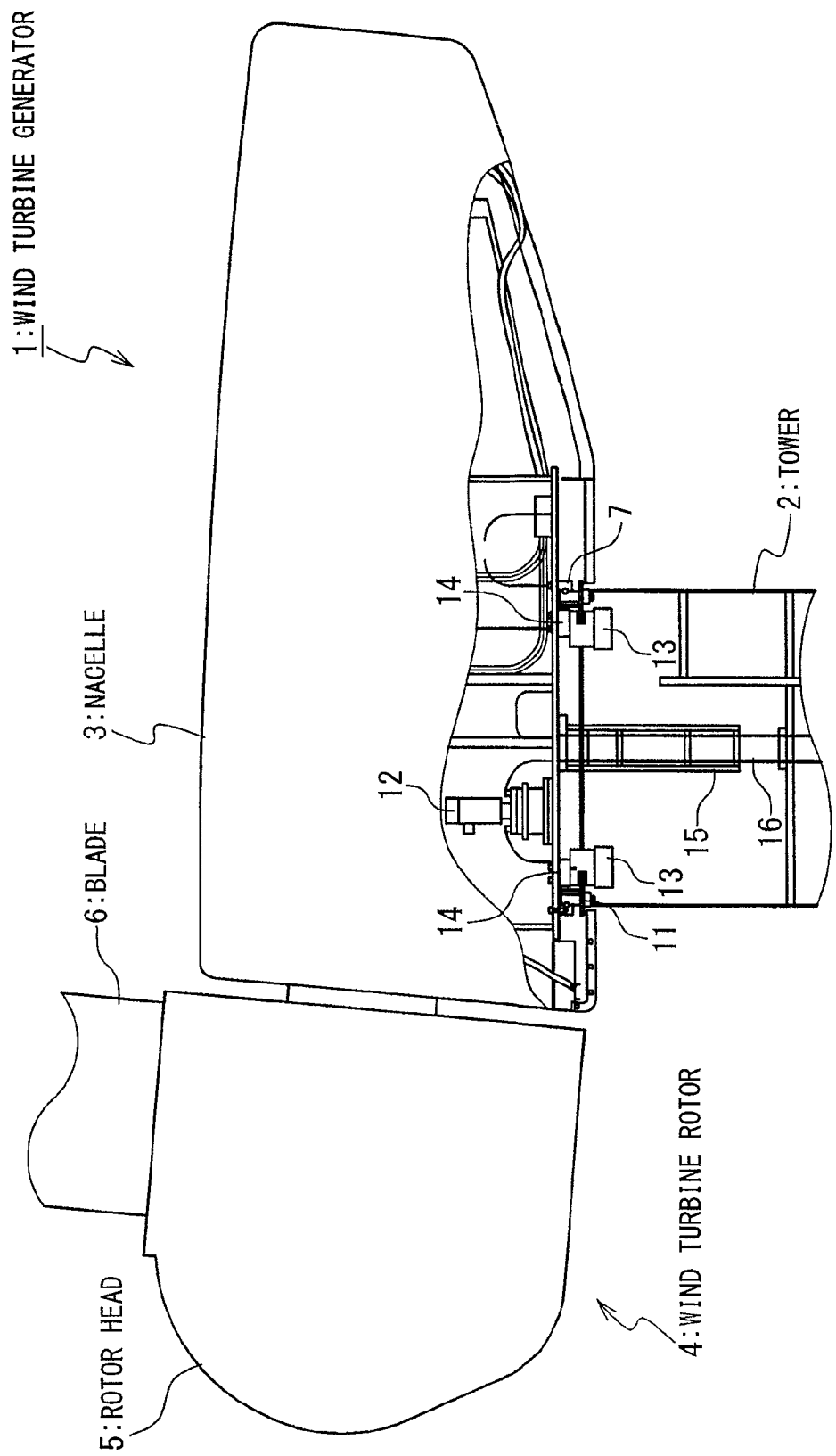
FIG. 1 is a side view showing the structure of a wind turbine generator in one embodiment of the present invention.

FIG. 1 is a partial cross section view showing the structure of a wind turbine generator to which a maintenance method of one embodiment of the present invention is applied. At first, the overall configuration of a wind turbine generator 1 will be explained. The wind turbine generator 1 is provided with: a tower 2; a nacelle 3 mounted on the tower 2; and a wind turbine rotor 4 rotatably attached to the nacelle 3. The wind turbine rotor 4 is provided with a rotor head 5 and blades 6. Although FIG. 1 shows only one blade 6, a plurality of blades 6 (typically, three blades 6) are actually attached to the rotor head 5.

Figure 2:
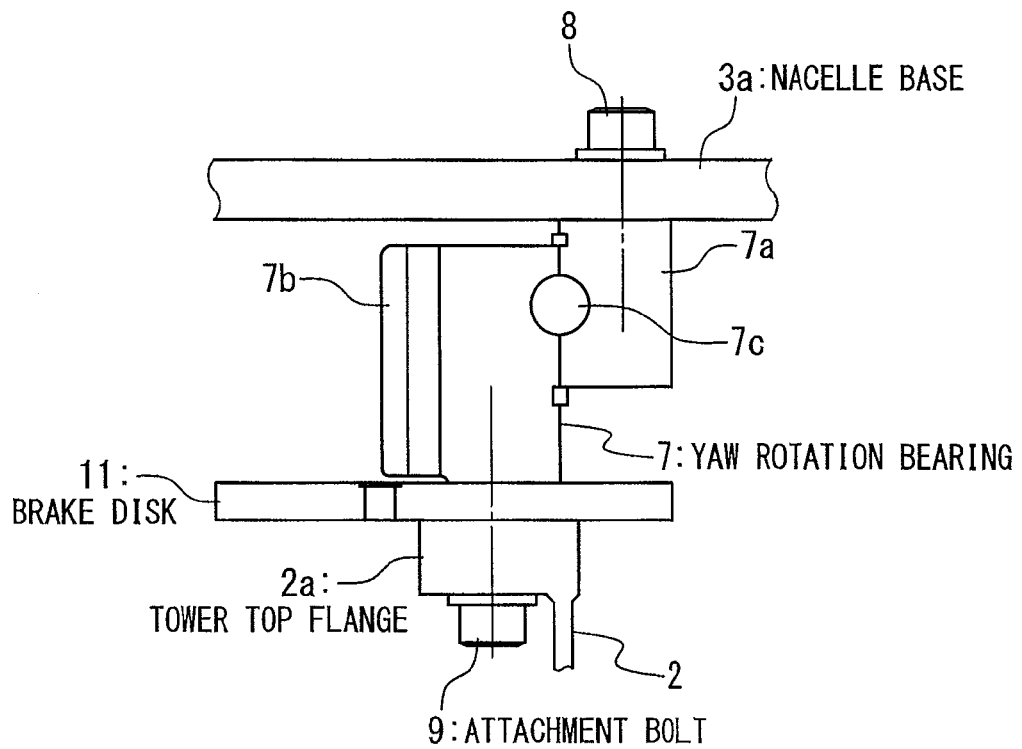
FIG. 2 is an enlarged cross section view showing the structure for coupling the nacelle with the tower so that the nacelle is rotatable, in one embodiment of the present invention.

The nacelle 3 is rotatably coupled to the tower 2. As shown in FIG. 2, a yaw rotation bearing 7 is provided between the nacelle and the tower 2. The yaw rotation bearing 7 includes an inner ring 7a, an outer ring 7b, and rolling members 7c (steel balls in this embodiment) inserted between the rings. The outer ring 7a of the yaw rotation bearing 7 is attached to a nacelle base 3a of the nacelle 3 by using bolts 8. On the other hand, the inner ring 7b of the yaw rotation bearing 7 is attached to a tower top flange 2a provided at the top of the tower 2 by using attachment bolts 9. Here, a brake disk 11 is sandwiched between the inner ring 7b and the tower top flange 2a. Although the outer ring 7a is coupled with the nacelle 3 and the inner ring 7b is coupled with the tower top flange 2a in this embodiment, the outer ring 7a may be coupled to the tower top flange 2a and the inner ring 7b may be coupled to the nacelle 3.

Referring back to FIG. 1, a yaw rotation mechanism is provided to the lower part of the nacelle 3. The yaw rotation mechanism includes a yaw motor 12 generating a drive force for the yaw rotation, and yaw brake calipers 13 for braking the rotation of the nacelle 3 by sandwiching the brake disk 11. The yaw brake calipers 13 are attached to yaw brake pedestals 14 provided for the nacelle 3. An opening is provided to the bottom part of the nacelle 3, and a ladder 15 is attached in the vicinity of the opening. Moreover, cables 16 connected to apparatuses provided in the nacelle 3 (a power generator and so on) are withdrawn and suspended from the opening. The cables 16 include: a power cable attached to the power generator and a control cable attached to the respective apparatuses in the nacelle 3.

Figure 3:
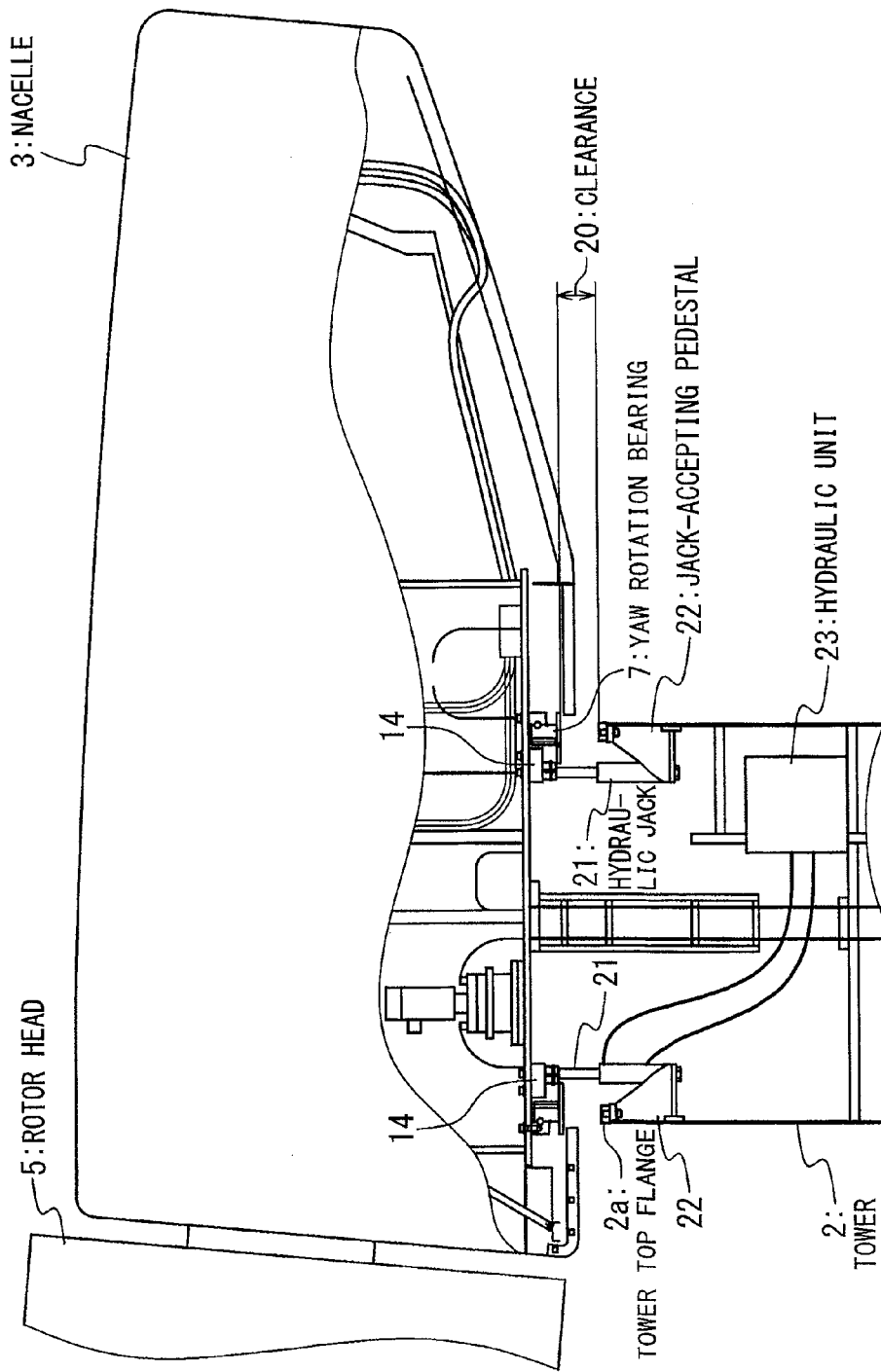
FIG. 3 is a side view showing a maintenance method of the wind turbine generator according to one embodiment of the present invention.

FIG. 3 is an exploded side view showing a method for carrying out the maintenance work which involves detaching the nacelle 3 from the tower 2 for the wind turbine generator 1 having the above-described configuration. In this embodiment, the nacelle 3 is jacked up by using hydraulic jacks 21, and accordingly a clearance 20 is formed between the nacelle 3 and the tower 2. Various maintenance works are carried out by using the clearance 20. Although two hydraulic jacks 21 are illustrated in FIG. 3, it should be understood that a sufficient number of hydraulic jacks 21 (for example, eight hydraulic jacks) are actually provided to support the nacelle 3.

Specifically, members interrupting a work for detaching the nacelle 3 from the tower 2 are first detached. For example, the yaw brake calipers 13 are detached from the yaw brake pedestals 14. If necessary, the cables 16 suspended from the nacelle 3 may be also detached.

Moreover, jack-accepting pedestals 22 are attached to the inner face of the upper end portion of the tower 2, and the hydraulic jacks 21 are attached to the jack-accepting pedestals 22. A hydraulic unit 23 is attached to each of the hydraulic jacks 21. The hydraulic unit 23 supplies operating fluid (operating oil) to the hydraulic jacks 21. The hydraulic jacks 21 are driven by supplying the operating fluid (the operating oil) to the hydraulic jacks 21, and thereby the nacelle 3 is jacked up. It should be noted that the hydraulic unit 23 is shown as being provided for only one hydraulic jack 21 in FIG. 3 for visibility of the drawing.

Figure 4:
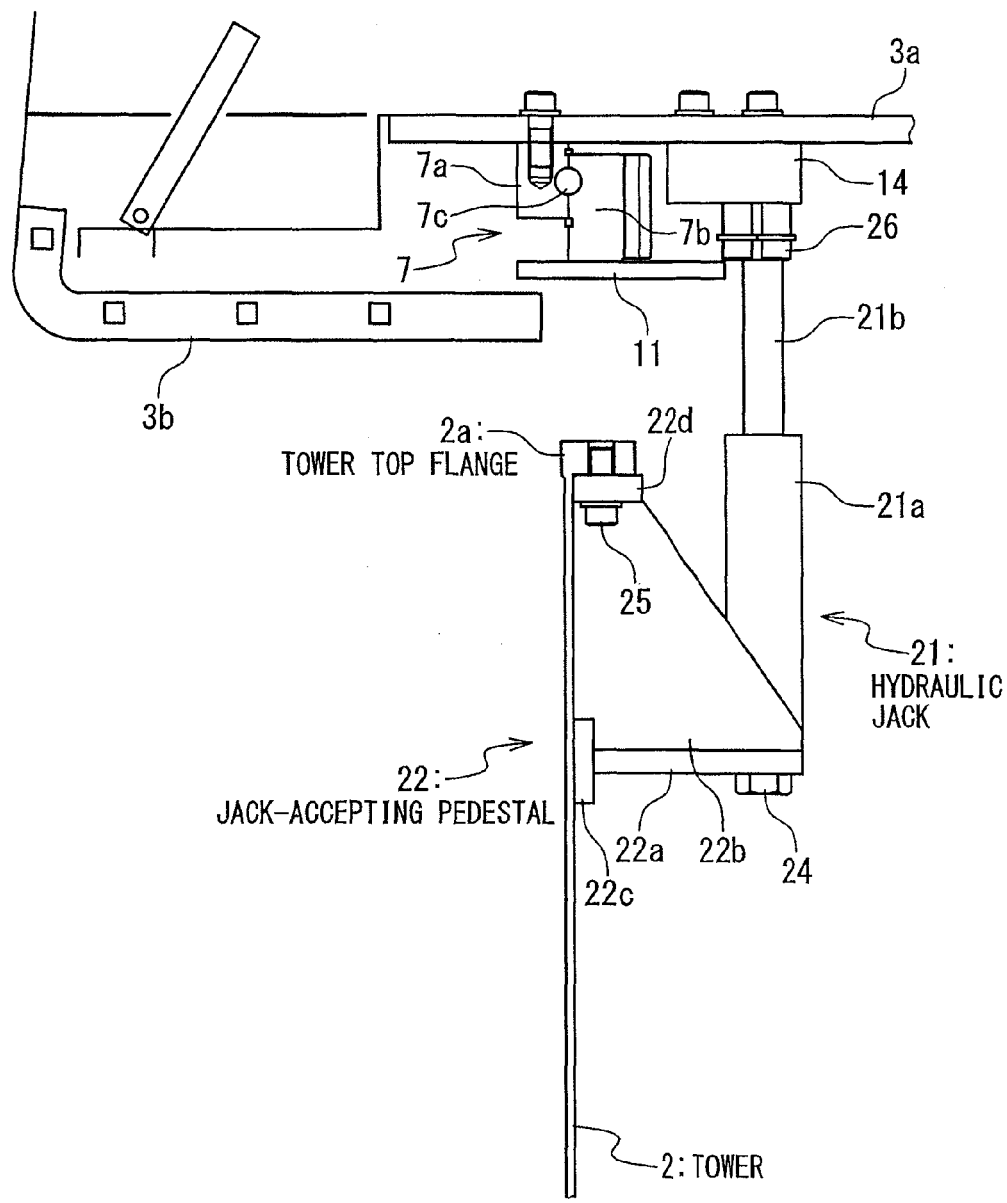
FIG. 4 is an enlarged cross section view showing the maintenance method of the wind turbine generator in one embodiment.

FIG. 4 is a cross section view showing the structure around the positions at which the hydraulic jacks 21 and the jack-accepting pedestals 22 are attached. The jack-accepting pedestals 22 each include a bottom plate 22a, a rib part 22b, a reaction force accepter 22c, and a flange 22d. The bottom plate 22a is a member to be attached to a hydraulic jack 21. A cylinder 21a of a hydraulic jack 21 is attached to the bottom plate 22a by using an attachment bolt 24. The rib part 22b is a reinforcement member for supporting the load applied in the vertical direction to the bottom plate 22a. The reaction force accepter 22c is jointed to the bottom plate 22a, and is abutted to the inner face of the tower 2. The reaction force accepter 22c is used for dispersing the force applied from the bottom plate 22a to the inner face of the tower 2. The flange 22d is provided to the upper end part of the rib part 22b, and is abutted to the tower top flange 2a of the tower 2. The flange 22d of the jack-accepting pedestal 22 is coupled to the tower top flange 2a by using an attachment bolt 25, and thereby the jack-accepting pedestal 22 is attached to the tower 2.

The tip end of the rod 21b of the hydraulic jack 21 is jointed to the nacelle base 3a of the nacelle 3. In this embodiment, the tip end of the rod 21b is coupled to a yaw brake pedestal 14 by using an attachment bolt 26. This prevents the nacelle 3 from falling down.

Figure 5:
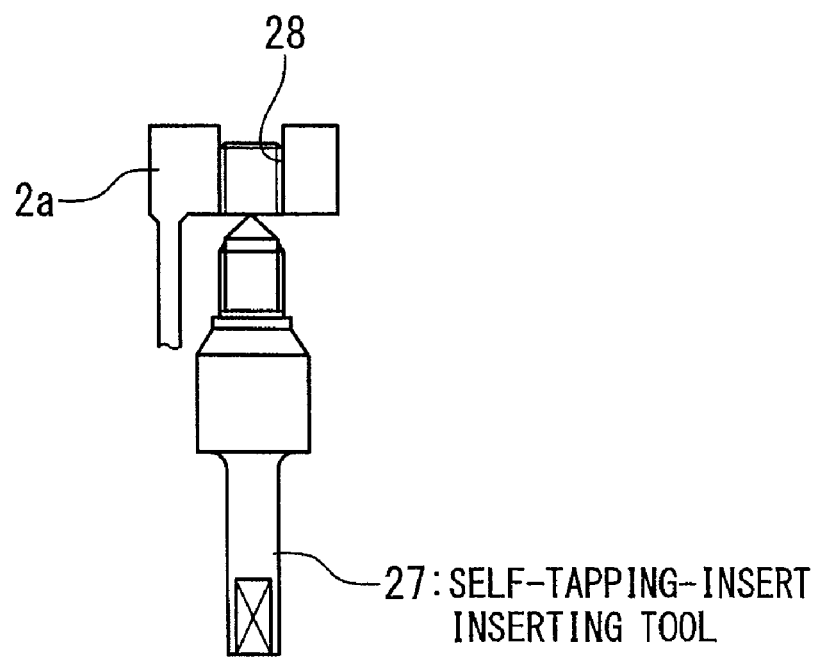
FIG. 5 is a cross section view showing a method for inserting a self-tapping insert in one embodiment.
Figure 6:
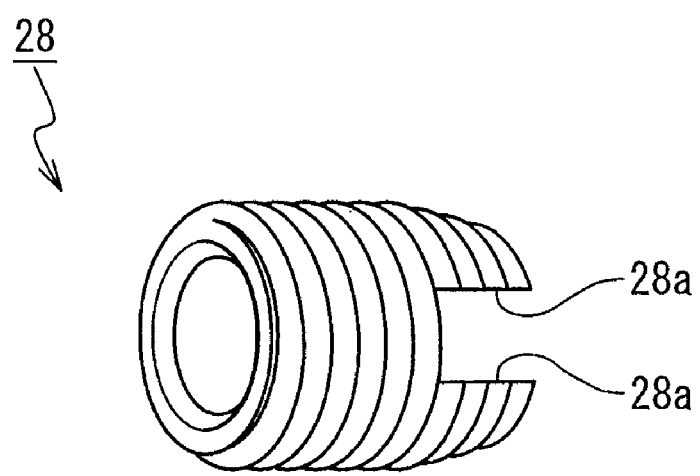
FIG. 6 is a perspective view showing the structure of the self-tapping insert in one embodiment.

When the maintenance method of this embodiment is implemented for the already-constructed wind turbine generator 1, no internal thread is provided for attaching the attachment bolt 25 to the tower top flange 2a. In this case, internal threads may be formed in the tower top flange 2a in the maintenance work. On this occasion, since through holes are usually formed through the tower top flange 2a for coupling the inner ring 7b of the yaw rotation bearing 7 with the tower top flange 2a by using the attachment bolts 9, the through holes may be used. In this case, as illustrated in FIG. 5, an internal thread can be easily formed through the tower top flange 2a by inserting a self-tapping insert 28 into a through hole by using a self-tapping-insert inserting tool 27. As illustrated in FIG. 6, the self-tapping insert 28 is an approximately-cylindrical member having threads on the inner and outer surfaces, and a cutting blade 28a is provided for the self-tapping insert 28. Even if no internal thread has been formed through the tower top flange 2a, an internal thread can be formed through the tower top flange 2a by inserting the self-tapping insert 28. After the completion of the maintenance work, the self-tapping insert 28 is detached.

Maintenance works carried out with the nacelle 3 jacked up include replacement of the yaw rotation bearing 7, replacement of the seal of the yaw rotation bearing 7, painting of the outer ring 7a, adjustment to obtain flatness of the tower top flange 2a (for example, adjustment of a shim), repair of the bottom part of the nacelle cover 3b of the nacelle 3, for example. Out of them, the replacement of the yaw rotation bearing 7 is one of the important maintenance works. In the following, a procedure of the replacement of the yaw rotation bearing 7 will be explained.

At first, after the ladder 15 and the cables 16 are detached from the nacelle 3, the nacelle 3 is jacked up in the above-mentioned procedure by the hydraulic jacks 21. This results in that a clearance 20 is provided between the nacelle 3 and the tower 2.

Figure 7:
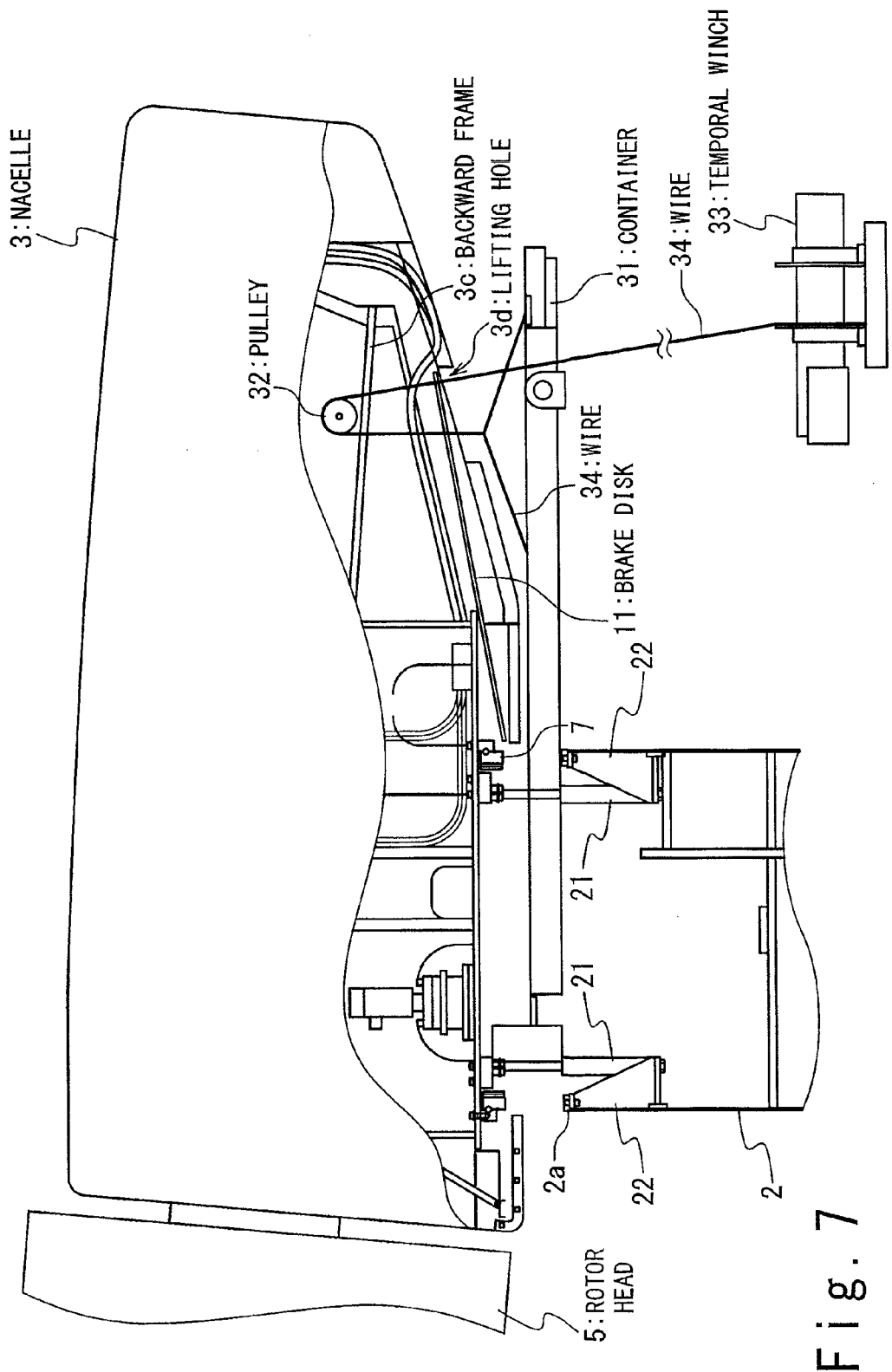
FIG. 7 is a side view showing a procedure of replacement of a yaw rotation bearing in one embodiment of the present invention.

Subsequently, as illustrated in FIG. 7, after the brake disk 11 is detached and housed inside the nacelle 3, the container 31 used for landing the yaw rotation bearing 7 on the ground is lifted to the vicinity of the nacelle 3. Specifically, a pulley 32 is attached to a backward frame 3c of the nacelle 3, a temporal winch 33 is provided on the ground, and additionally a lifting hole 3d for passing a wire 34 is provided to the lower part of the nacelle 3. One end of the wire 34 is wound on the temporal winch 33, and the other end is attached to the container 31 with the wire 34 looped on the pulley 32. The container 31 is lifted up by winding the wire 34 by the temporal winch 33.

Figure 8:
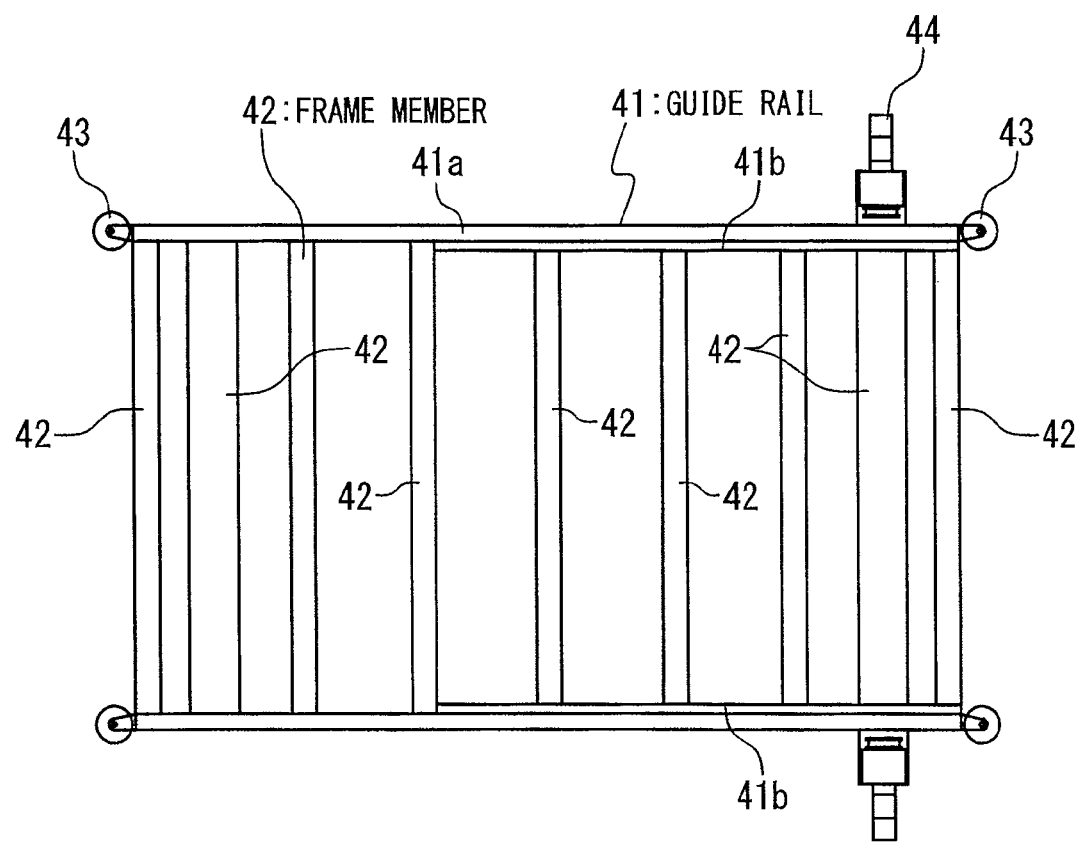
FIG. 8 is a plan view showing the configuration of a container used in the replacement of the yaw rotation bearing.
Figure 9:
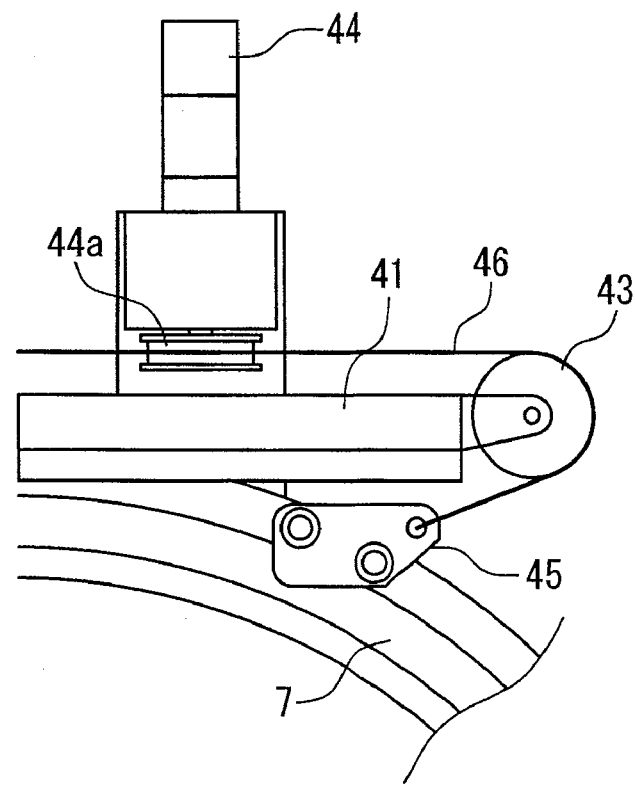
FIG. 9 is an enlarged plan view showing the configuration of the container used in the replacement of the yaw rotation bearing.
Figure 10:
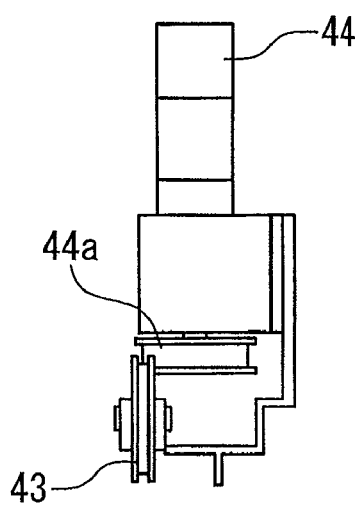
FIG. 10 is a front view showing the configuration of a drive unit attached to the container.

FIG. 8 is a plan view showing the structure of the container 31. The container 31 includes two guide rails 41, frame members 42, pulleys 43, and drive units 44. The container 31 is configured so that the yaw rotation bearing 7 put thereon is movable in the longitudinal direction of the guide rail 41. Specifically, each of the guide rails 41 includes an outside rail 41a and an inside rail 41b, and the inside rails 41b are movable in the longitudinal direction with respect to the outer rails 41a. As described below, the yaw rotation bearing 7 is moved in a state in which the yaw rotation bearing 7 is sandwiched by the inside rails 41b. The frame members 42 are coupled between the outside rails 41a of the two guide rails 41. The pulleys 43 and the drive units 44 form a bearing movement mechanism for applying a force to the yaw rotation bearing 7 in moving of the yaw rotation bearing 7. The pulleys 43 are attached to both ends of the guide rails 41, and the drive units 44 are attached to the outside rails 41a of the guide rails 41, each including a capstan 44a driven by a motor (not shown in the drawing) as shown in FIGS. 9 and 10. The rotation axes of the capstans 44a are vertical to the rotation axes of the pulleys 43. As shown in FIG. 9, when the yaw rotation bearing 7 is moved, wire fixation attachments 45 are fixed to the yaw rotation bearing 7 by using bolts, and wires 46 are attached to the wire fixation attachments 45. The yaw rotation bearing 7 can be moved in the longitudinal direction of the guide rail 41 by driving the wires 46 with the pulleys 43 and the capstans 44a of the drive units 44, and when the yaw rotation bearing 7 (or the inside rails 41b sandwiching the bearing) is supported, the container 31 (that is, the outside rails 41a of the guide rails 41) also can be moved with respect to the yaw rotation bearing 7.

Referring back to FIG. 7, after the empty container 31 is lifted, the lifted container 31 is inserted into the clearance 20 between the nacelle 3 and the tower 2, and then one of the frame members 42 is attached to the tower top flange 2a by using bolts. On this occasion, the container 31 is inserted in the longitudinal direction of the guide rail 41.

Figure 11:
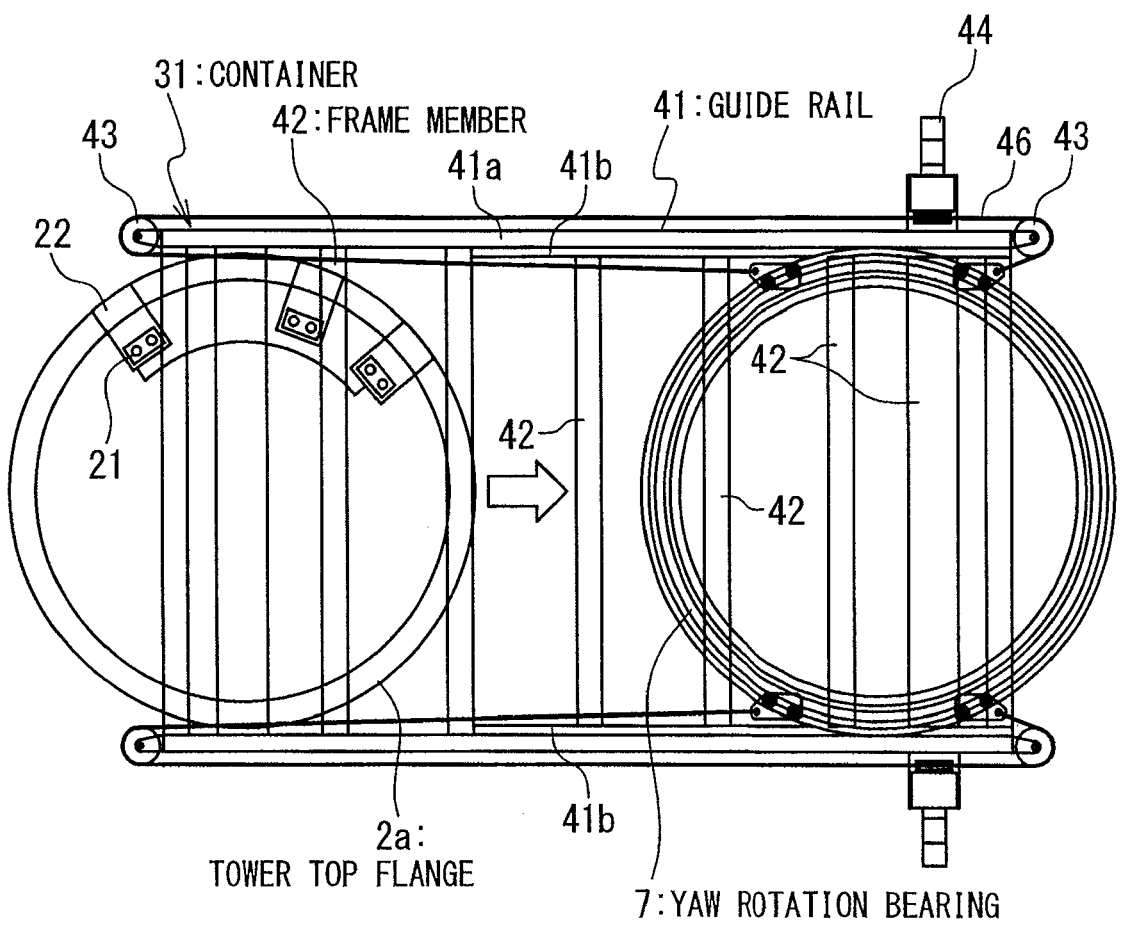
FIG. 11 is a top view showing a procedure of conveyance of the detached yaw rotation bearing by using the container.

Moreover, as shown in FIG. 11, the yaw rotation bearing 7 is detached from the nacelle 3 and put on the container 31, and then the yaw rotation bearing 7 is moved to a position that is not in a vertically-upward direction of the tower 2 by the drive units 44 mounted on the container 31. Specifically, the yaw rotation bearing 7 is put on the container 31, and is further sandwiched by the inside rails 41b. The wire fixation attachments 45 are fixed to the yaw rotation bearing 7 by using bolts, and the wires 46 are attached to the wire fixation attachments 45. The wires 46 are driven by the pulleys 43 and the capstans 44a of the drive units 44 to thereby move the yaw rotation bearing 7. The yaw rotation bearing 7 is moved to a position under the pulley 32 attached to the nacelle 3.

After the yaw rotation bearing 7 is moved to the position under the pulley 32, the wire 34 tied to the temporal winch 33 is attached to the yaw rotation bearing 7, and the yaw rotation bearing 7 is suspended by the wire 34. On this occasion, the wire 34 is looped on the pulley 32. Moreover, the container 31 is moved by applying a force to the outside rails 41a with the bearing movement mechanism, so that the center of the container 31 is positioned at the center of the yaw rotation bearing 7.

Figure 12:
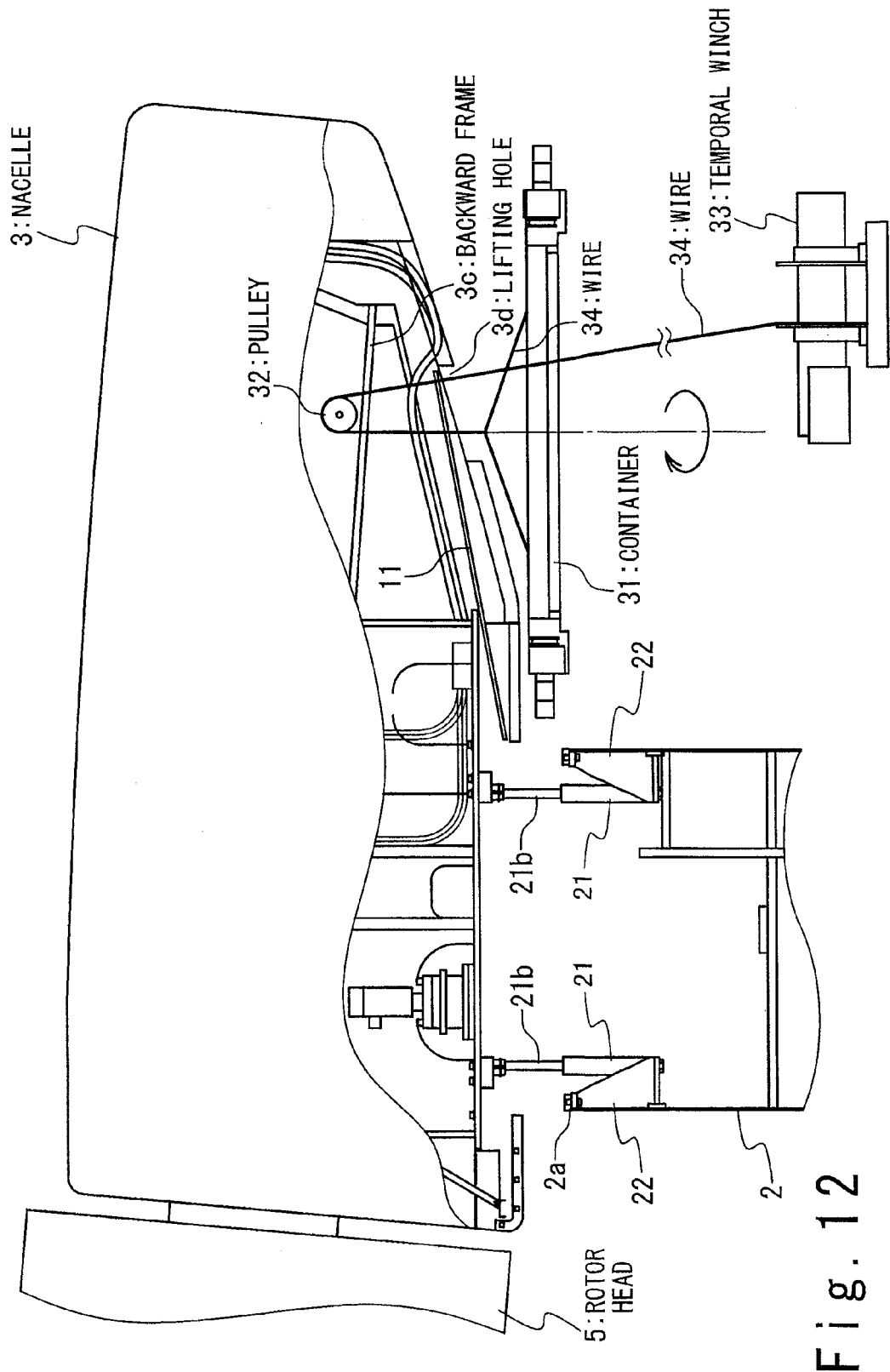
FIG. 12 is a side view showing the procedure of conveyance of the detached yaw rotation bearing by using the container.
Figure 13:
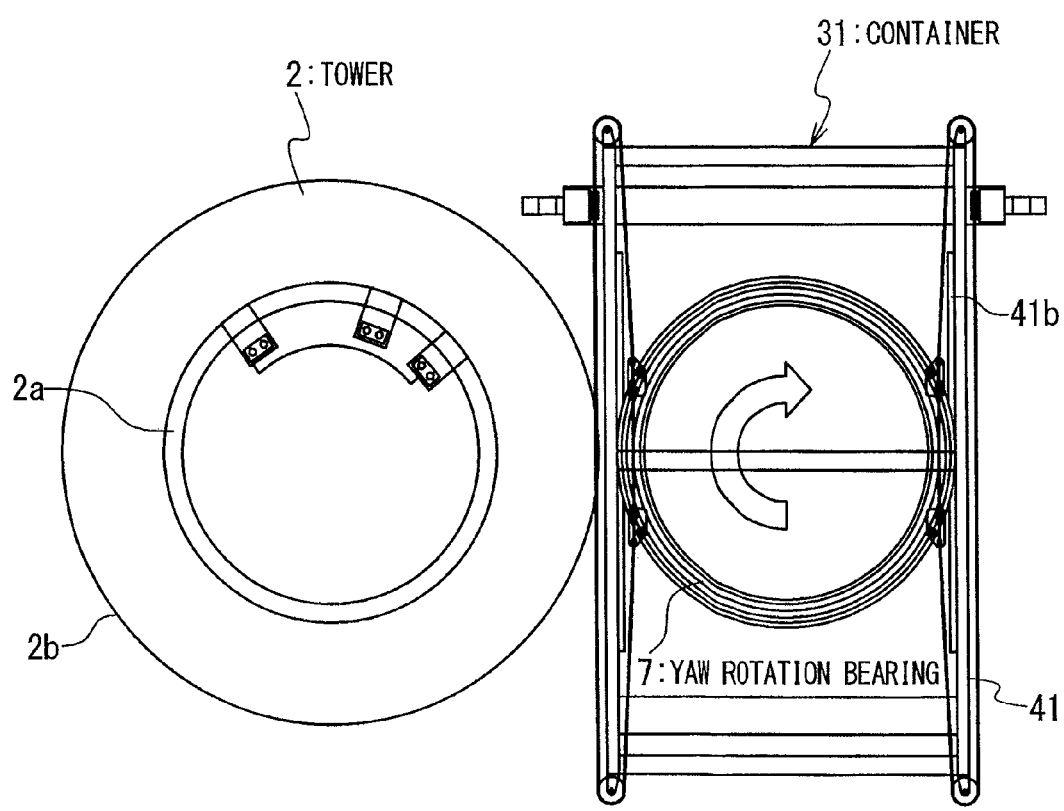
FIG. 13 is a top view showing the procedure of conveyance of the detached yaw rotation bearing by using the container.

Subsequently, as illustrated in FIGS. 12 and 13, the container 31 is turned by 90° in order to prevent interference between the container 31 and the tower 2. Here, a numeral symbol 2b in FIG. 13 represents the outer rim at the lower end of the tower 2. Moreover, the wire 34 is withdrawn from the temporal winch 33 in a state in which the yaw rotation bearing 7 and the container 31 are suspended by the wire 34, and thereby the yaw rotation bearing 7 and the container 31 are landed on the ground.

It should be noted that, when a rod 21b of a hydraulic jack 21 interferes with the brake disk 11, the container 31 and/or the yaw rotation bearing 7 in carrying out the procedure to detach the yaw rotation bearing 7, the interfering rod 21b is detached from the nacelle 3 and is pulled down. Preparing a sufficient number of the hydraulic jacks 21 allows supporting the nacelle 3 even when the rods 21b of some of the hydraulic jacks 21 are pulled down.

Figure 14:
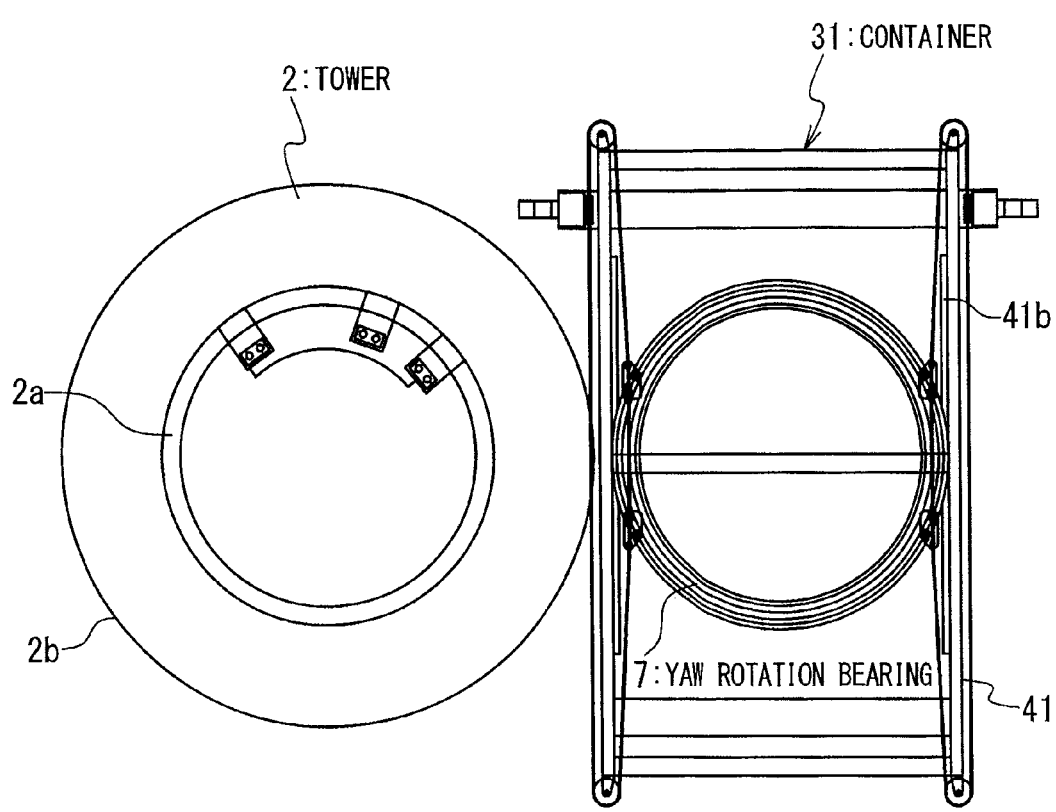
FIG. 14 is a top view showing a procedure of conveyance of a new yaw rotation bearing to be attached to the nacelle by using the container.
Figure 15:
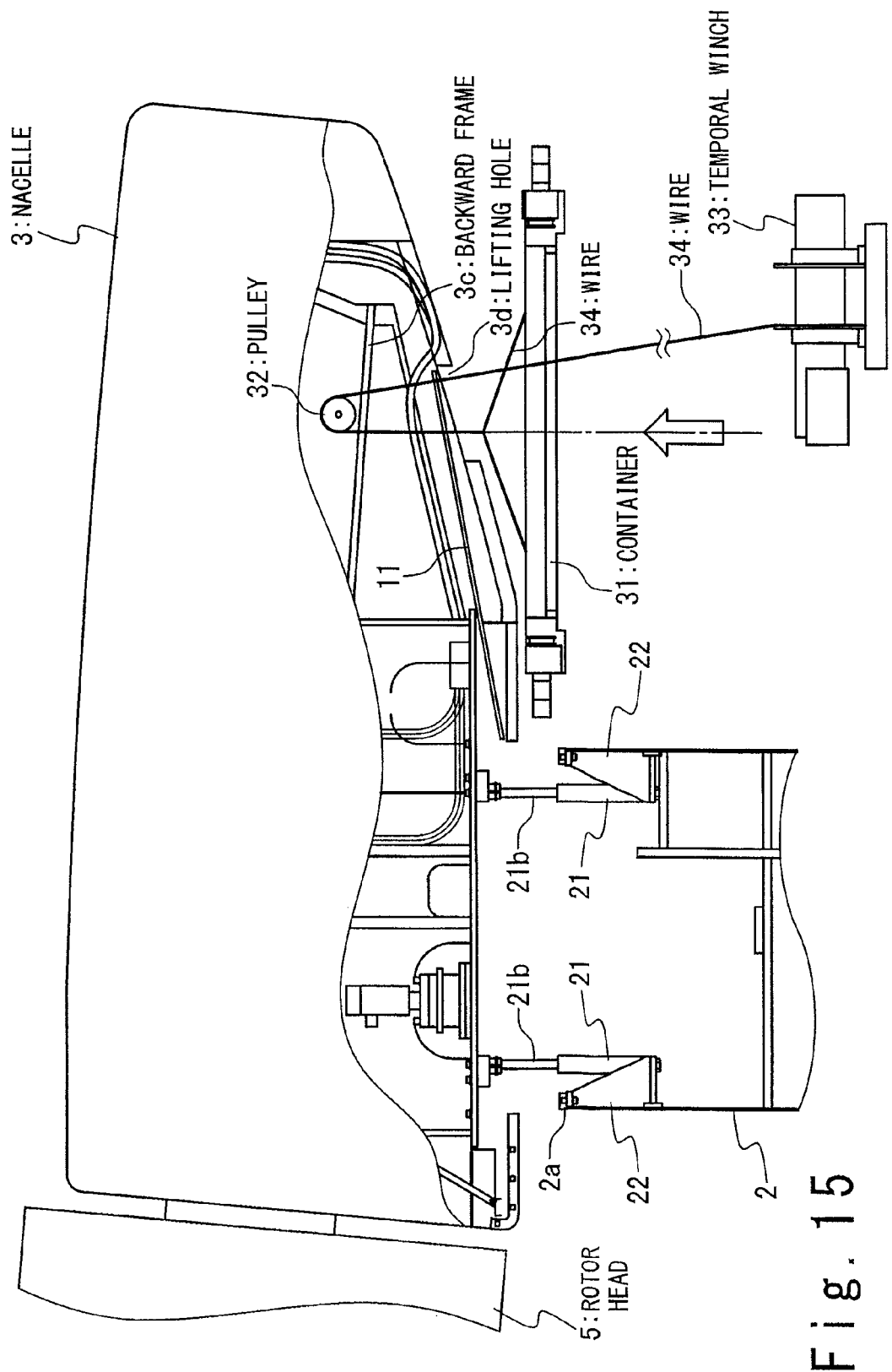
FIG. 15 is a side view showing the procedure of conveyance of the new yaw rotation bearing to be attached to the nacelle by using the container.

Subsequently, a new yaw rotation bearing 7 is attached to the nacelle 3 by implementing the procedure in the reverse order. Specifically, as illustrated in FIG. 14, the yaw rotation bearing 7 is sandwiched between the inside rails 41b of the guide rails 41, and the yaw rotation bearing 7 is attached to the center of the container 31. Then, as illustrated in FIG. 15, the wire 34 is attached to the yaw rotation bearing 7, and the yaw rotation bearing 7 and the container 31 are pulled up to a position immediately below the nacelle 3 by using the pulley 32 attached to the nacelle 3 and the temporal winch 33 provided on the ground. On this occasion, in order to prevent the interference between the container 31 and the tower 2, the longitudinal direction of the guide rail 41 is maintained to be vertical to the radial direction of the tower 3.

Figure 16:
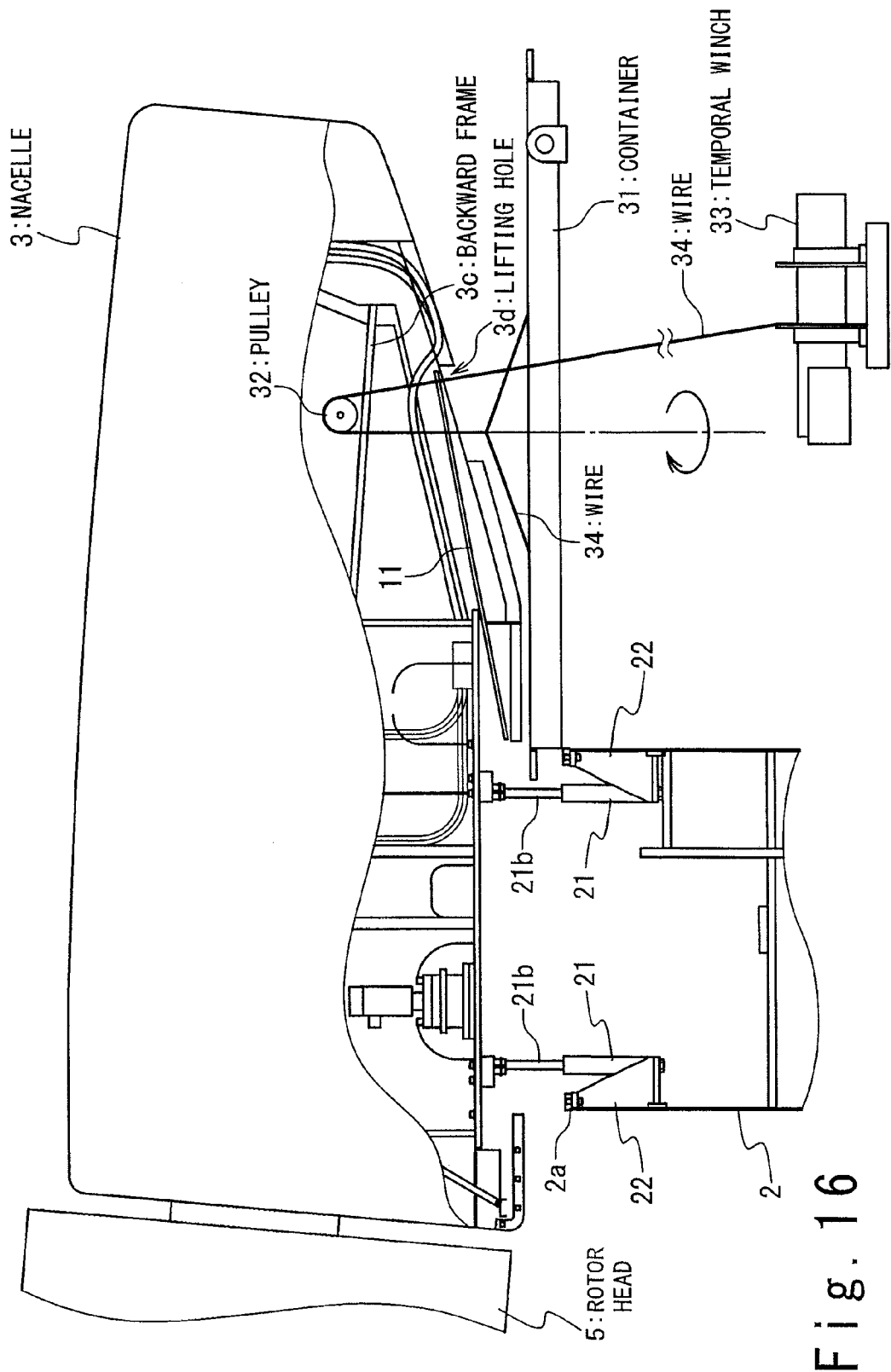
FIG. 16 is a side view showing the procedure of conveyance of the new yaw rotation bearing to be attached to the nacelle by using the container.
Figure 17:
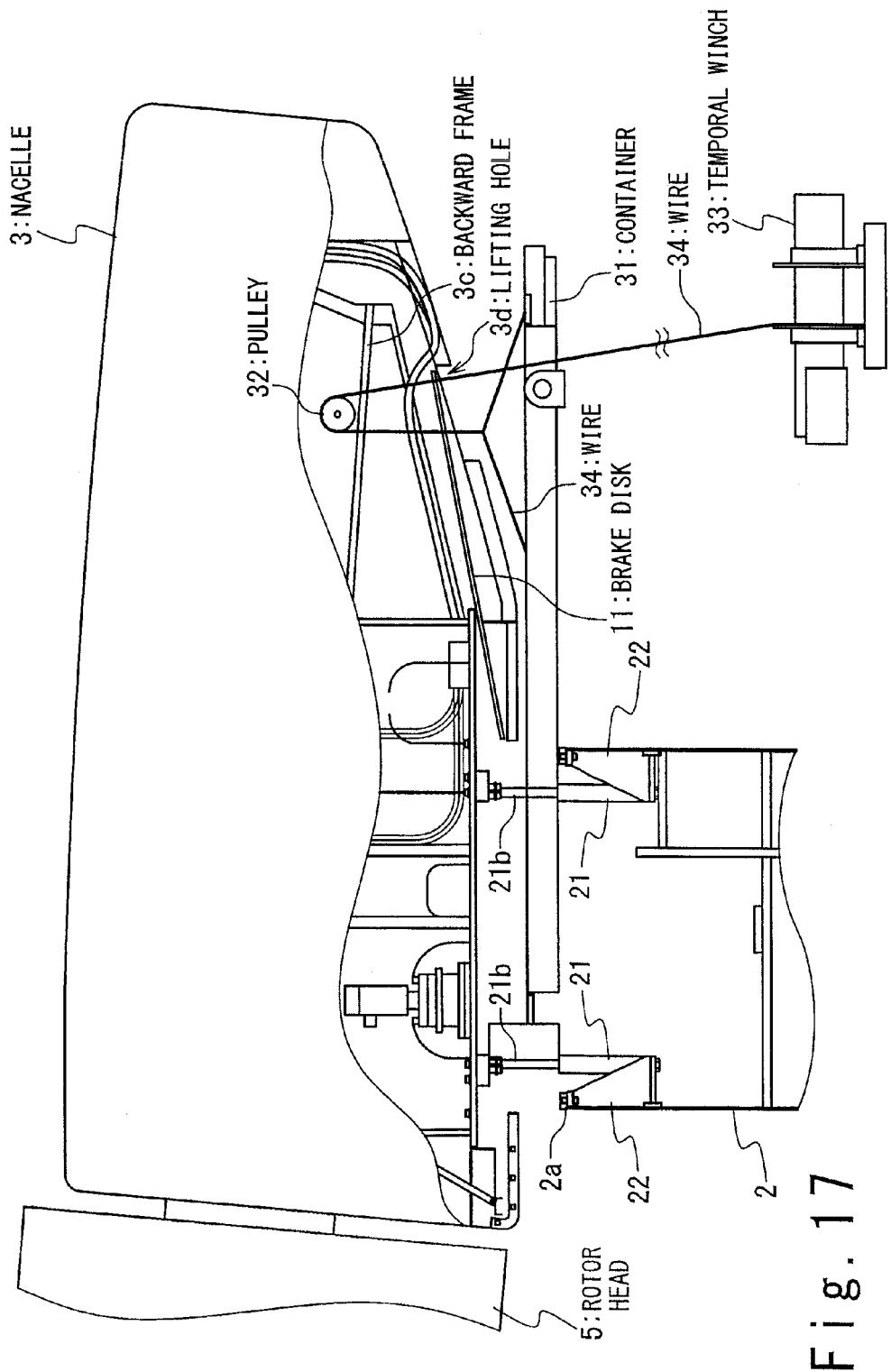
FIG. 17 is a side view showing the procedure of conveyance of the new yaw rotation bearing to be attached to the nacelle by using the container.
Figure 18:
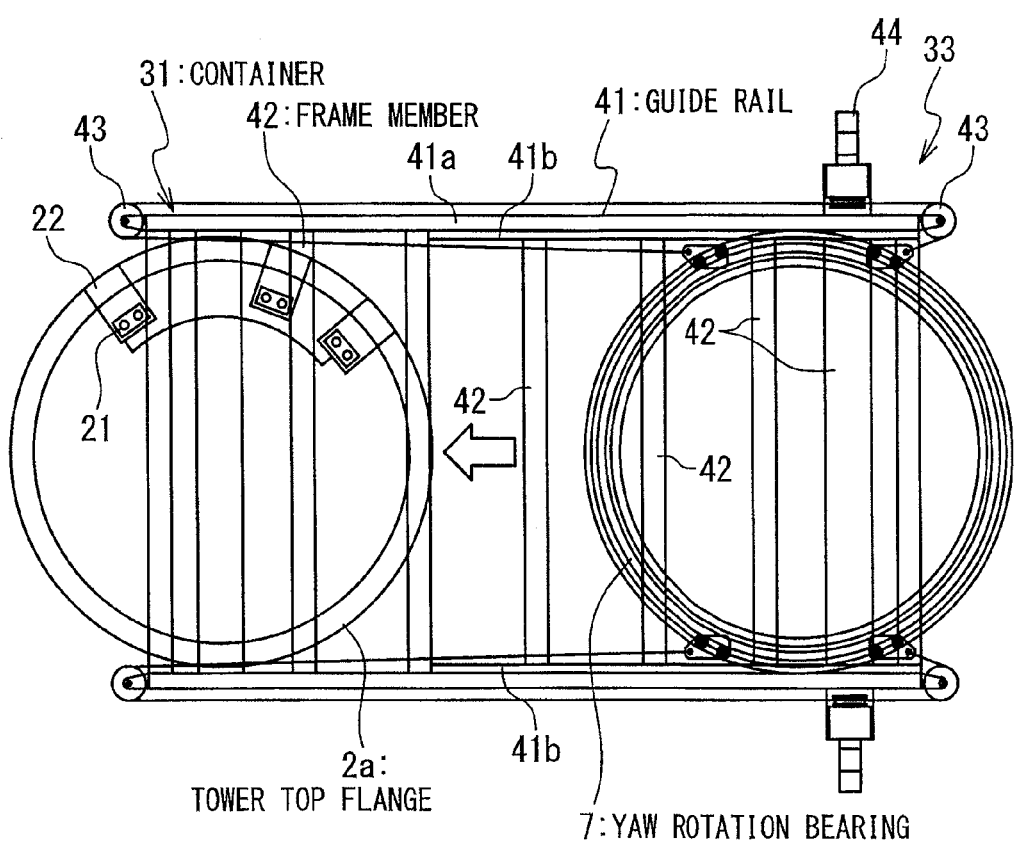
FIG. 18 is a top view showing the procedure of conveyance of the new yaw rotation bearing to be attached to the nacelle by using the container.

Next, as shown in FIG. 16, the container is turned by 90°, and thereby the longitudinal direction of the guide rail 41 is directed to be parallel with the radial direction of the tower 3. The drive units 44 are operated in this state, and thereby the outside rails 41a of the guide rails 41 of the container 31 are pushed to a position near the center of the tower top flange 2a as shown in FIG. 17. Moreover, as illustrated in FIG. 18, one of the frame members 42 of the container 31 is fixed to the tower top flange 2a by using bolts. Then, the drive units 44 of the container 31 are operated, and thereby the yaw rotation bearing 7 is moved so that the center of the yaw rotation bearing 7 is positioned around the center of the tower 2. After that, the yaw rotation bearing 7 is attached to the nacelle base 3a of the nacelle 3. This is followed by pulling down the rods 21b of the hydraulic jacks 21 after the brake disk 11 is attached, and thereby the nacelle 3 is pulled down on the tower 2. Moreover, the work for restoring the wind turbine generator 1 is carried out, including the attachment of the attachment bolts 8 and 9 of the yaw rotation bearing 7, the ladder 15 and the cables 16 and so on. This completes the replacement of the yaw rotation bearing 7. It should be noted that, when a rod 21b of a hydraulic jack 21 interferes with the brake disk 11, the container 31 and/or the yaw rotation bearing 7, the interfering rod 21b is detached from the nacelle 3 and is pulled down, also in the procedure to attach the yaw rotation bearing 7.

It should be noted that, although the works for lifting up the container 31 in the vicinity of the nacelle 3 and for landing the container 31 on the ground are carried out in the above-described embodiment by using the pulley 32 attached to the nacelle 3 and the temporal winch 33 provided on the ground, these works may be carried out by using a winch attached to the nacelle 3 instead. In this case, the container 31 is lifted up to the vicinity of the nacelle 3 or is landed on the ground by winding the wire 34 attached to the container 31 with the winch or withdrawing the wire from the winch.

Also, although structures for supporting the hydraulic jacks 21 (that is, the jack-accepting pedestals 22) are attached to the tower 2 so that the hydraulic jacks 21 are positioned inside the tower 2 in the above-mentioned procedure of the replacement of the yaw rotation bearing 7, the structures for supporting some or all of the hydraulic jacks may be provided outside the tower 2.

Figure 19:
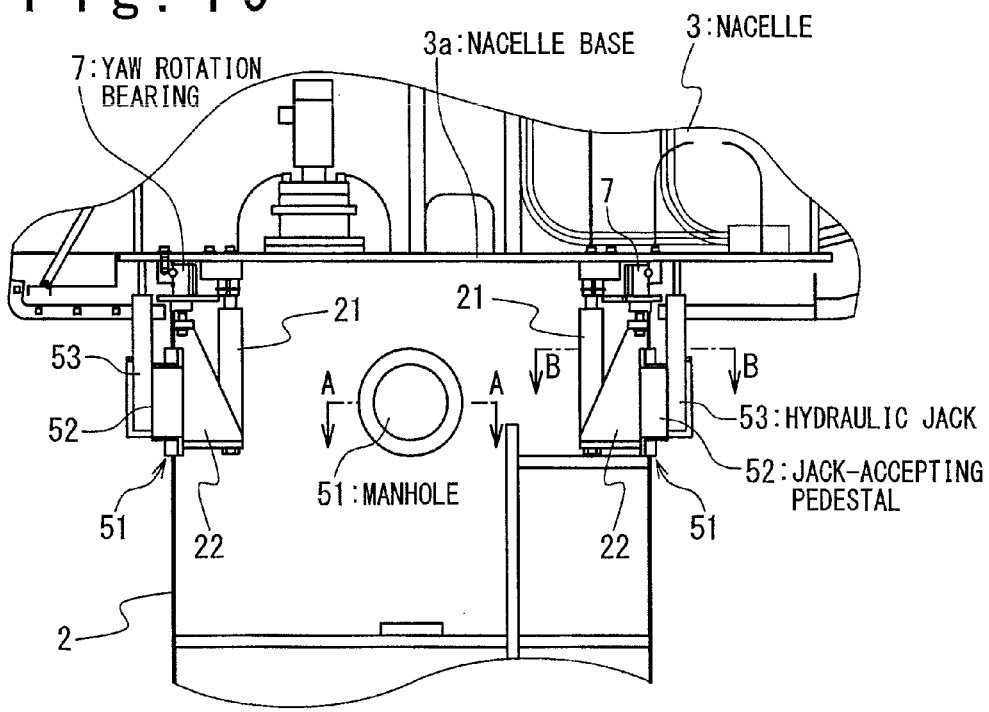
FIG. 19 is a side view showing a maintenance method of a wind turbine generator in another embodiment of the present invention.
Figure 20:
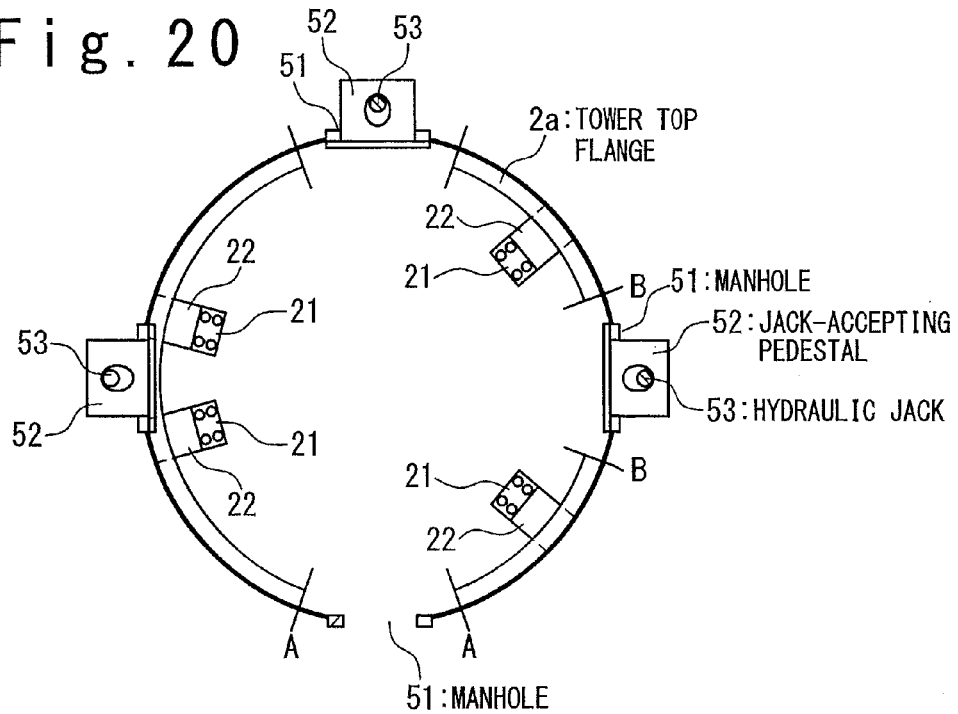
FIG. 20 is a top view showing the maintenance method of the wind turbine generator of FIG. 19.

In one embodiment, as illustrated in FIGS. 19 and 20, manholes 51 are formed in the vicinity of the upper end of the tower 2, and the jack-accepting pedestals 52 are inserted into the manholes 51. A jack-accepting pedestal 52 is a structure for supporting a hydraulic jack 53. It should be noted that, when no manholes 51 are provided for the tower 2 as for the already-constructed wind turbine generator 1, the manholes 51 may be newly bored. In a case where the wind turbine generator 1 is newly constructed, the manholes 51 may be formed in the construction. Although FIGS. 19 and 20 illustrate a state where the jack-accepting pedestal 52 is not inserted to the manhole 51 corresponding to a cross section A-A, these drawings are illustrated simply to explain the structure of the manhole 51. Actually, the jack-accepting pedestal 52 is inserted into each of all the manholes 51. The rods of the hydraulic jacks 53 are abutted to the bottom surface of the nacelle base 3a of the nacelle 3, and thereby the nacelle 3 is supported. In the configuration of FIGS. 19 and 20, the nacelle 3 is supported by the hydraulic jacks 53 positioned outside the tower 2 in addition to the hydraulic jacks 21 positioned inside the tower 2. Referring to FIG. 20, in one embodiment, four hydraulic jacks 21 are provided inside the tower 2, and four hydraulic jacks 53 are provided outside the tower 2. In the configuration of FIG. 20, the hydraulic jacks 53 are arranged at angle intervals of 90° in the circumferential direction of the tower 2.

Figure 21A:
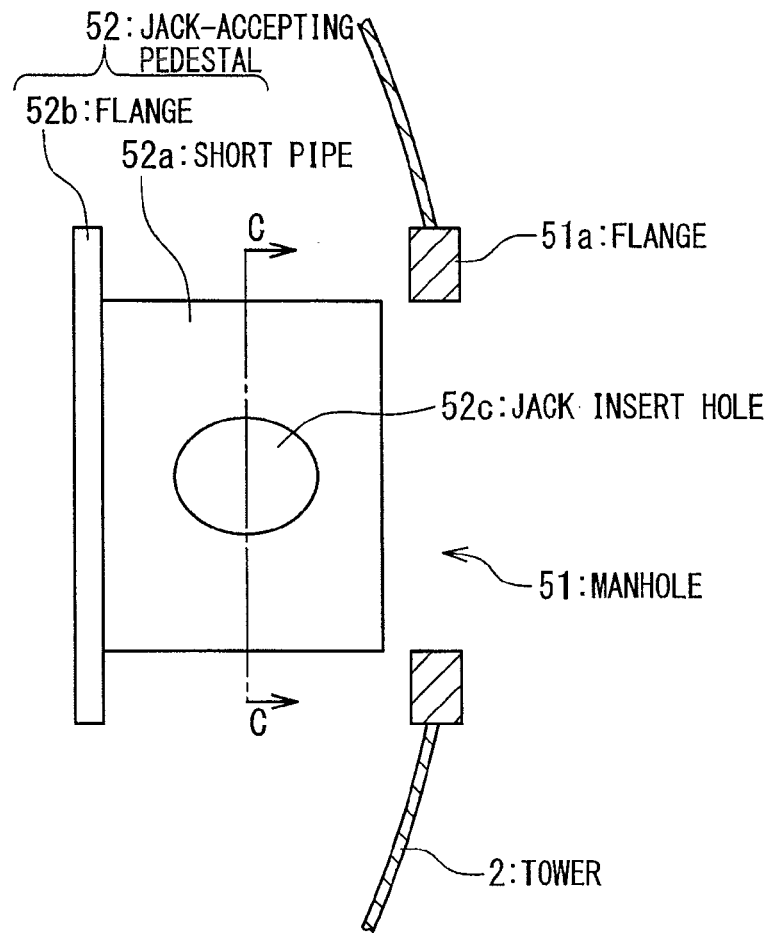
FIG. 21A is a side view showing structures of a manhole provided to a tower and of a jack-accepting pedestal inserted into the manhole.
Figure 21B:
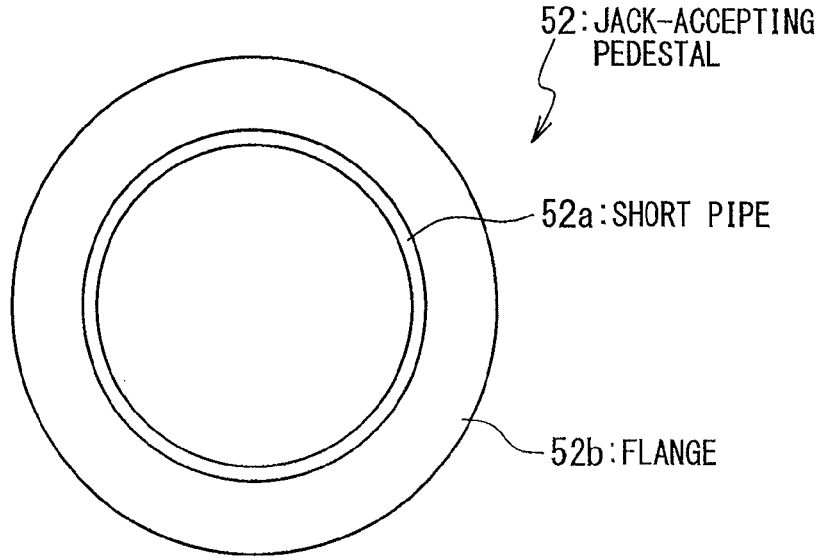
FIG. 21B is a front view showing the structure of the jack-accepting pedestal.
Figure 21C:
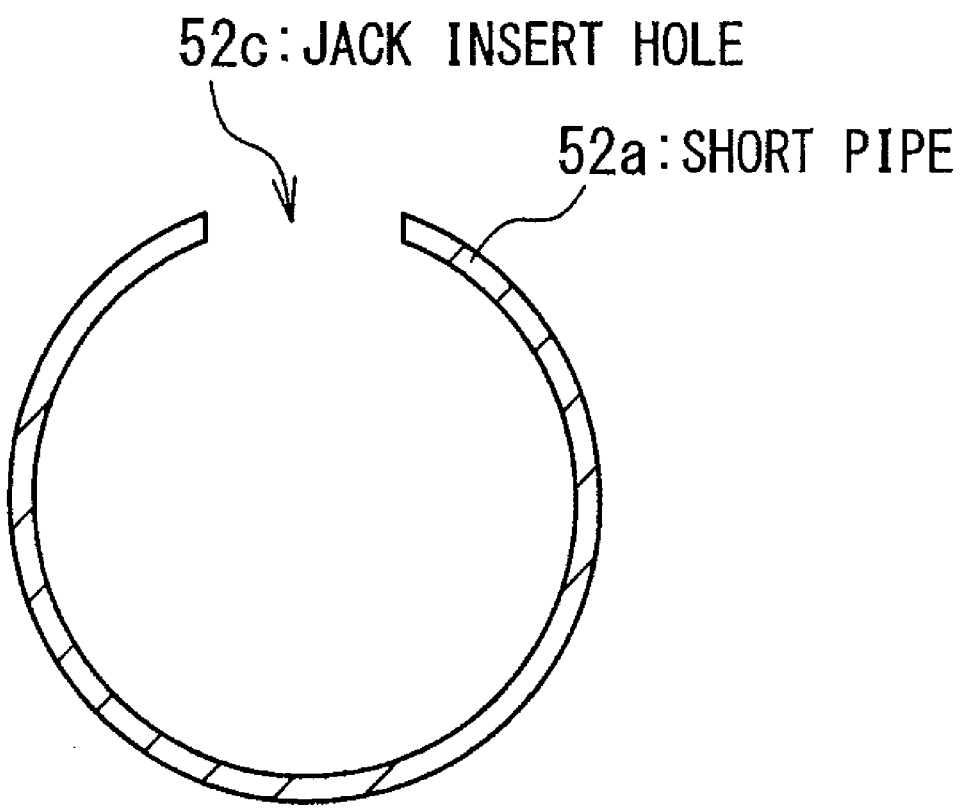
FIG. 21C is a cross section view showing the structure of the jack-accepting pedestal in the E-E cross section of FIG. 21B.

FIG. 21A is a diagram showing the structures of manholes 51 and the jack-accepting pedestals 52. As shown in FIG. 21A, the manholes 51 are provided through the tower 2. A flange 51a having a thickness larger than that of the tower 2 is provided to a rim of each manhole 51. The jack-accepting pedestals 52 each includes a short pipe 52a and a flange 52b. FIG. 21B is a diagram in which a jack-accepting pedestal 52 is viewed from the short pipe 52a. As shown in FIG. 21B, the short pipe 52a is schematically in a cylindrical shape, and the flange 52b is schematically in a disc shape. The short pipe 52a is inserted into the manhole 51 outward of the tower 2, and further the flange 51a of the manhole 51 and the flange 52b of the jack-accepting pedestal 52 are fixed by using bolts to thereby fix the jack-accepting pedestal 52 to the tower 2. FIG. 21C shows a structure of the short pipe 52a in the C-C cross section. A jack insert hole 52c is provided for the short pipe 52a. A hydraulic jack 53 is inserted into the jack insert hole 52c, and thereby the hydraulic jack 53 is fixed to the jack-accepting pedestal 52.

An advantage of positioning the hydraulic jacks 53 outside the tower 2 is that this makes it unlikely for the hydraulic jacks to interfere in replacing the yaw rotation bearing 7. When the hydraulic jacks 53 are positioned outside the tower 2, the hydraulic jacks 53 other than the hydraulic jack(s) 53 arranged on the path where the container 31 is moved in and out for replacing the yaw rotation bearing 7 are able to continuously support the nacelle 3 constantly without pulling down the rods during the replacement of the yaw rotation bearing 7. Referring to FIG. 20, let us consider a case, for example, where the yaw rotation bearing 7 is replaced by removing the old yaw rotation bearing 7 to the right side of the tower 2 by using the container 31 and a new yaw rotation bearing 7 is installed from the right side of the tower 2. In this case, it is required to pull up and down the rods of the hydraulic jack 53 positioned on the right side of the tower 2, in order to allow the yaw rotation bearing 7 to go thereby; however, the rods of the other hydraulic jacks 53 are not required to be pulled up and down. On the other hand, the hydraulic jacks 21 positioned inside the tower 2 are required to pull up and down the rods so as not to interfere with the yaw rotation bearing 7. As thus discussed, it is preferable that the hydraulic jacks 53 are positioned outside the tower 2 for the purpose of the steady supporting of the nacelle 3.

Figure 22:
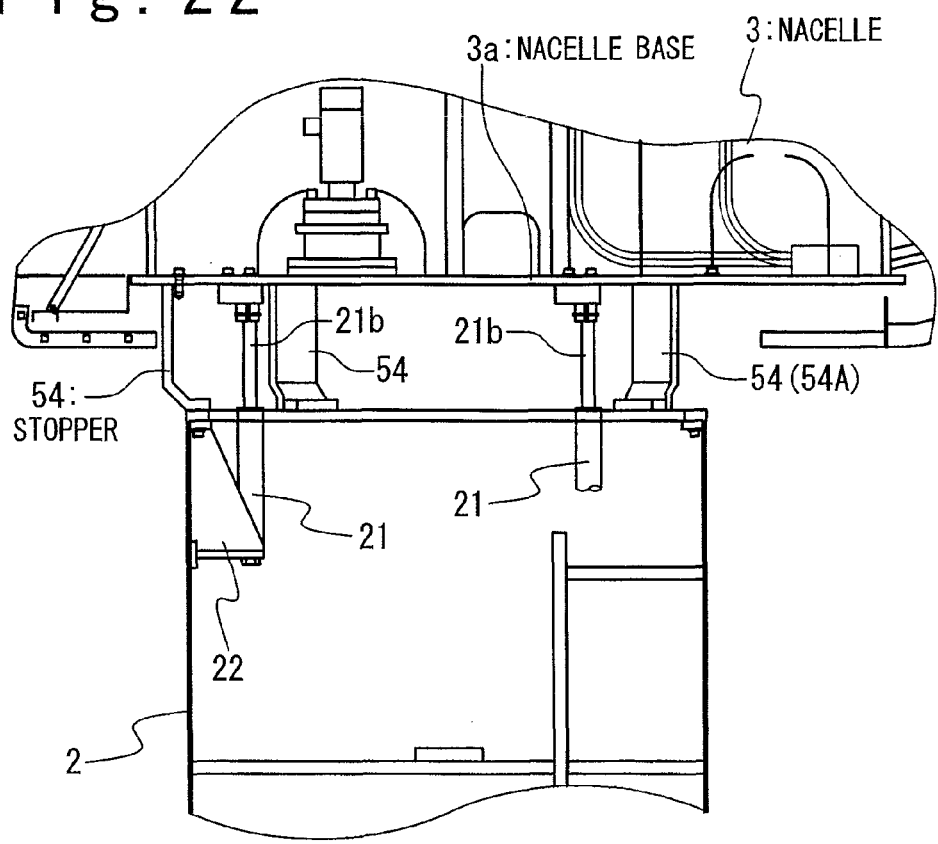
FIG. 22 is a side view showing a maintenance method of a wind turbine generator in still another embodiment of the present invention.
Figure 23:
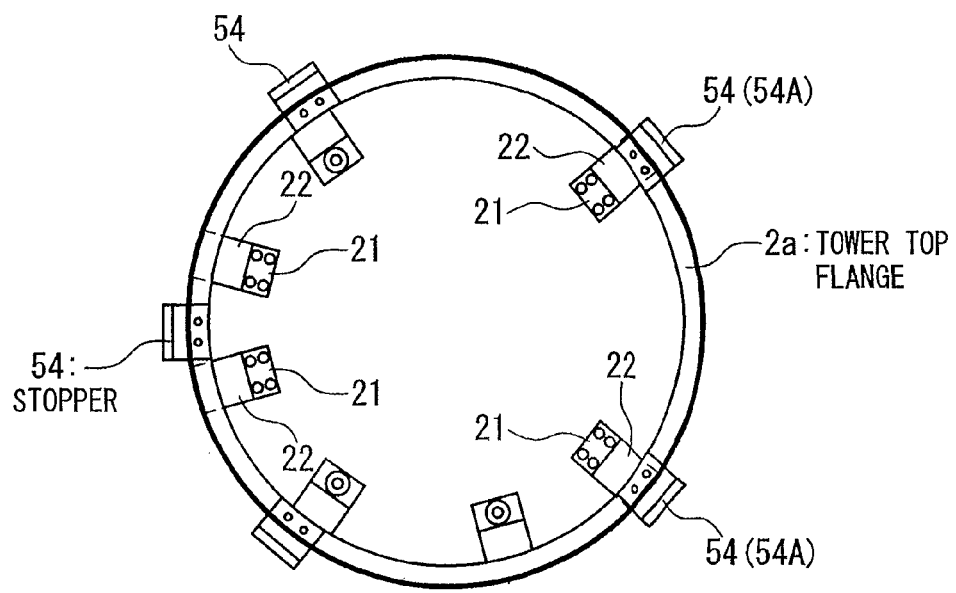
FIG. 23 is a top view showing the maintenance method of the wind turbine generator in the other embodiment of the present invention.

As illustrated in FIGS. 22 and 23, it is preferable to support the nacelle 3 by using stoppers 54 after jacking up the nacelle 3 with the hydraulic jacks 21 (or the hydraulic jacks 53) in order to support the nacelle 3 more steadily. Here, a stopper 54 is a structural member for supporting the nacelle 3 by being sandwiched between the tower top flange 2a and the nacelle 3. The lower ends of the stoppers 54 are fixed to the tower top flange 2a by bolts, and the upper ends of the stoppers 54 are fixed to the nacelle 3 by bolts. The use of the stoppers 54 in addition to the hydraulic jacks 21 (or the hydraulic jacks 53) improves certainty of the supporting of the nacelle 3. The stopper(s) 54 arranged on the path where the container 31 is moved in and out is detached in replacing the yaw rotation bearing 7. When the old yaw rotation bearing 7 is removed to the right side of the tower 2 by using the container 31 and a new yaw rotation bearing 7 is installed from the right side of the tower 2, the stoppers 54 (stoppers 54A) in FIG. 23 positioned on the right side of the tower 2 are detached. Moreover, the rods 21b of the hydraulic jacks 21 interfering with the container 31 are pulled up and down appropriately, and thus the nacelle 3 is supported.

As described above, the maintenance method of the wind turbine generator of the present embodiment allows implementing a maintenance work which involves detaching the nacelle from the tower (for example, the replacement of the yaw rotation bearing) without using a large size crane.

What is claimed is:

1. A maintenance method of a wind turbine generator including a tower and a nacelle, the maintenance method comprising:
    attaching a pedestal to said tower;
    attaching a jack to said pedestal;
    lifting said nacelle by pushing up a lower part of said nacelle using said jack, thereby detaching said nacelle from said tower when said nacelle is rotatably connected to the tower;
    providing a yaw rotation bearing for rotatably connecting said nacelle to said tower;
    replacing said yaw rotation bearing when said nacelle is detached from said tower;
    lifting a container containing a new yaw rotation bearing to a vicinity of said nacelle by using a wire connected to a winch and looped on a pulley; and
    attaching said new yaw rotation bearing to said nacelle.

2. The maintenance method according to claim 1, further comprising:
    attaching the pulley to the nacelle;
    preparing a winch;
    lifting the container to a vicinity of said nacelle by using the wire connected to said winch and looped on said pulley;
    putting said yaw rotation bearing attached to said nacelle on said container; and
    landing said container containing said yaw rotation bearing on the ground by using said wire.

3. The maintenance method according to claim 1, further comprising:
    forming an internal thread through a tower top flange provided at an upper end of said tower; and
    connecting said pedestal to said tower by screwing a bolt through said internal thread.

4. The maintenance method according to claim 3, further comprising:
    inserting a self-tapping insert into said tower top flange for forming said internal thread in the tower top flange,
    wherein the self-tapping insert is approximately cylindrical and has threads on inner and outer surfaces.

* * * * *